United States Patent [19]

Friedman

[11] 4,063,175

[45] Dec. 13, 1977

[54] AMPLIFIER FOR RECEIVE MODE OPERATION

[76] Inventor: Eliot I. Friedman, 1175 Wendy Road, Ann Arbor, Mich. 48103

[21] Appl. No.: 711,785

[22] Filed: Aug. 5, 1976

[51] Int. Cl.² .............................................. H04B 1/10
[52] U.S. Cl. ..................... 325/377; 325/21; 325/313; 325/485; 330/151
[58] Field of Search .................. 325/17, 18, 21, 22, 325/312, 313, 318, 319, 365, 373, 374, 376, 377, 380, 399, 480, 485, 387, 401, 404; 330/151, 29, 124 R; 358/184

[56] References Cited

U.S. PATENT DOCUMENTS

| | | | |
|---|---|---|---|
| 3,168,707 | 2/1965 | Levitt et al. | 330/151 |
| 3,368,156 | 2/1968 | Kam | 330/151 |
| 3,530,245 | 9/1970 | Berns | 325/21 |
| 3,761,823 | 9/1973 | Harris | 325/313 |

*Primary Examiner*—Robert L. Griffin
*Assistant Examiner*—Jin F. Ng
*Attorney, Agent, or Firm*—Cullen, Settle, Sloman & Cantor

[57] ABSTRACT

An amplifier circuit to be interposed between an antenna and a utilization unit such as a radio, scanner, citizens band transceiver or the like. The amplifier circuit includes a current divider for dividing incoming signals into first and second parallel paths and a current amplifier including a pair of cascaded transistors to receive and amplify signals in said second path. The signals in the first path are passed to the utilization unit without amplification. A sensing network is provided to bypass the current divider and the amplifier when the utilization unit is transmitting signals.

8 Claims, 1 Drawing Figure

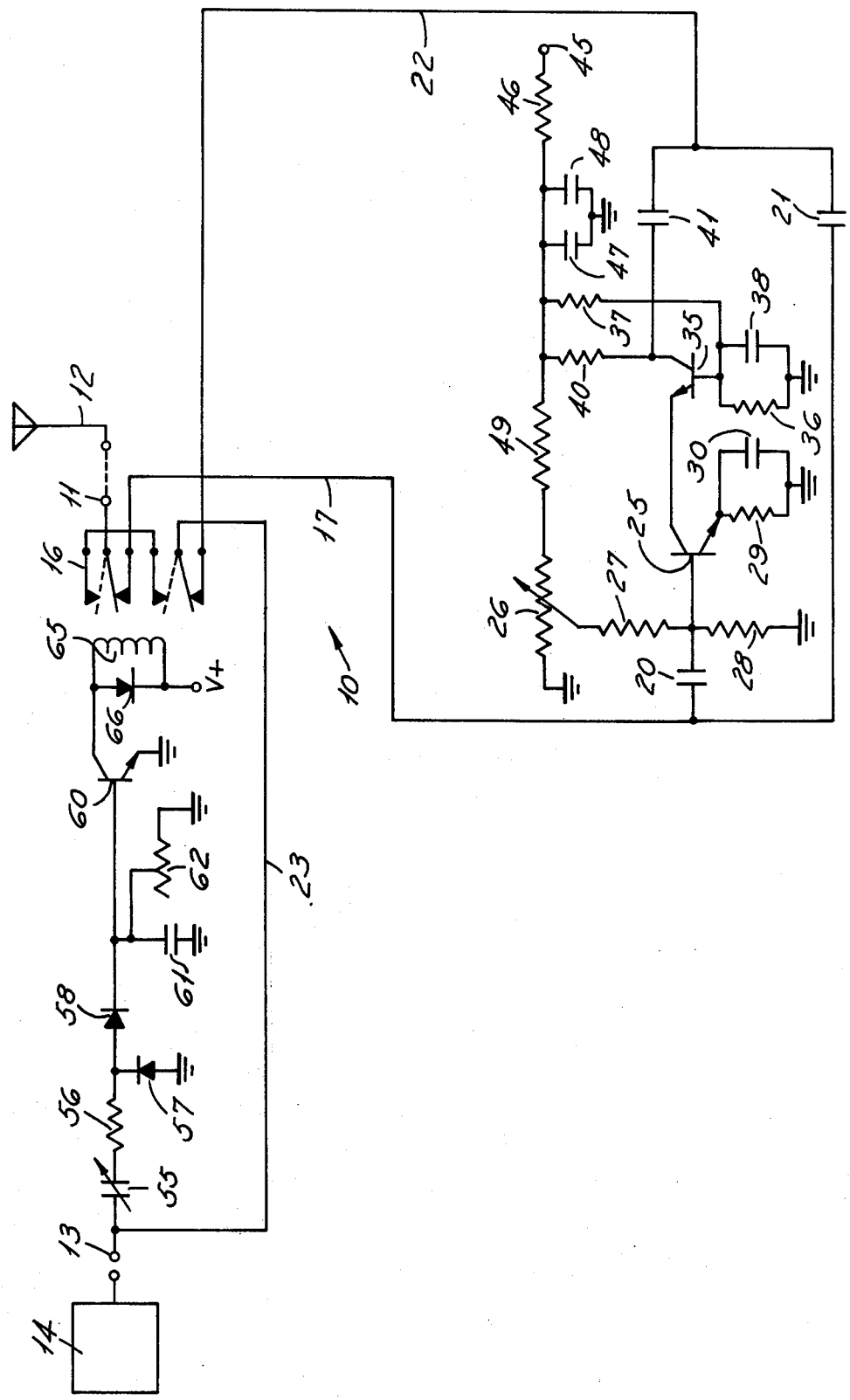

AMPLIFIER FOR RECEIVE MODE OPERATION

BACKGROUND OF THE INVENTION

This invention relates generally to communication systems and, more particularly, to an amplifier circuit for a communication device such as a radio, scanner, citizens band transceiver or the like. More particularly, the present invention relates to an improved amplifier circuit for increasing the gain for radio frequency signals by more than twenty decibels.

The present invention has a particular utility in conjunction with communication devices such as radios, scanners and citizens band transceivers utilized in a vehicle such as an automobile or a truck. Thus, the invention will be described in that context. However, the principles of the present invention may be utilized in all forms of communications systems and may be utilized with permanent installations such as in the home as well as in mobile installations such as in vehicles.

The communications industry is well aware of the difficulty of reception of radio frequency signals in certain areas because of the strength of the signal. Thus, in the so called fringe areas, there is great difficulty in receiving a sufficiently strong radio signal. In addition, with respect to citizens band transceivers, the power limitations imposed on mobile units by the Federal Communications Commission effectively limit the range of these devices to fifty miles or less depending upon terrain and other factors which would create interference. Hence in areas of high density structures such as high rise apartment buildings and office buildings, a range of one mile or less is not uncommon for citizens band transceivers.

The present invention overcomes these problems by boosting or amplifying the incoming signal by at least twenty decibels which is a power amplification of one thousand percent. Thus, an incoming signal is amplified an additional ten times by the present invention.

SUMMARY OF THE INVENTION

The present invention is directed to an amplifier circuit adapted to be interconnected between an antenna and a communication device such as a radio, scanner, transceiver or the like to amplify the incoming signals by at least twenty decibels.

The present invention includes a sensing network to bypass the amplifier circuit when the communications unit is transmitting signals. Thus, the present invention will not cause the transmitter to generate signals in excess of the power limitations imposed by the Federal Communications Commission.

An additional feature of the present invention is to pass some of the incoming signals directly to the communications unit without amplification in those instances where the incoming signal is of sufficient strength that either no gain (amplification) or some attenuation is desired.

BRIEF DESCRIPTION OF THE DRAWINGS

The various features and advantages of the present invention will become more apparent upon reading the following detailed description taken in conjunction with the drawings.

The single FIGURE is an electrical circuit schematic representation of the present invention.

DETAILED DESCRIPTION OF THE INVENTION

The present invention is described in the context of an amplifier circuit for installation in an automobile between the conventional automobile antenna lead and the conventional input from the antenna to the communication device such as a receiver or transceiver. The circuit 10 of the present invention thus receives input signals at an input terminal 11 from an antenna 12 and provides output signals at an output terminal 13 which is connected to a utilization device 14 which may be an AM receiver, an FM receiver, a scanning monitor, a citizens band transceiver or the like.

The input signal received from the antenna goes through a double pole double throw relay 16 which is normally biased in a first position as illustrated to couple the input signal to the amplification part of the circuit. Thus the signal passes through the relay and outwardly along lead 17.

The circuit includes a capacitive current divider including parallel first and second capacitors 20 and 21 having their reactances in a ratio of 10 to 1 so that approximately one tenth of the signal is passed through capacitor 21 and outwardly along lead 22 back to the relay and thereafter along lead 23 to the output terminal 13. This provides a passive transfer of the incoming signal directly to the utilization device 14 and is desirable when no power is applied to the amplifier or in strong signal areas such as adjacent a transmitter where no gain and possibly some attenuation is desired.

The remaining 90 percent of the signal is passed through capacitor 20 and through a gain control network to the base of a first transistor 25. The gain control network includes a first potentiometer 26 having one side grounded and a second resistor 27 having one side connected to the junction of capacitor 20 and the base of the transistor 25 and its other side connected to the wiper of the potentiometer 26. Potentiometer 26, which has its wiper manually controlled as is conventional, provides the desired gain of the amplification circuit and resistor 27 limits the base current to the transistor 25. This base current may be varied within the linear operating range of the transistor by adjustment of the potentiometer 26. When the wiper of the potentiometer is at ground, no base current flows, transistor 25 is cut off, and the only signal which reaches the output terminal 13 is that signal flowing through capacitor 21.

Input impedance to the transistor 25 is established by a resistor 28 coupled between ground and the junction of capacitor 20 and the base of transistor 25 and by a second resistor 29 coupled between the emitter of transistor 25 and ground. A capacitor 30, coupled in parallel across resistor 29 is a bypass capacitor to increase the radio frequency gain.

The output from transistor 25 is coupled along the collector to the emitter of a second transistor 35. Transistor 35 operates in a grounded base configuration and the base current of transistor 35 is set by a resistor 36, which is coupled between the base of transistor 35 and ground, and by a second resistor 37. Thus resistor 36 and 37 serve as a voltage divider. A capacitor 38, coupled in parallel across resistor 36, decouples the base of transistor 35 to ground and provides grounding of radio frequency signals while permitting d.c. bias, i.e., conventional grounded base amplifier operation. Transistors 25, 35 are connected in a cascaded configuration.

A load resistor 40 is coupled to the collector of transistor 35 and permits the output voltage to be developed thereacross and the output voltage passes through a capacitor 41 from the collector of transistor 35 onto lead 22 and thence to the output terminal 13.

Power input to the amplifier circuit 10 is provided at a terminal 45 which would typically be the input from a vehicle battery of nominally 13.8 volts. A resistor 46 is coupled on one side to the terminal 45 and the other side of resistor 46 is coupled to one side of parallel capacitors 47 and 48. The other side of capacitors 47 and 48 are grounded. Thus resistor 46 and capacitors 47 and 48 decouple the amplifier circuit from the vehicle charging circuit and reduce engine ignition and alternater noise. Load resistor 37 is coupled to the junction of capacitor 47 and 48 and resistor 46 and, at this point, the effective voltage is 12 volts. Thus the voltage drop across resistor 46 is nominally 1.8 volts. However, should the vehicle battery be operating at less than nominal voltage, the present circuit will still operate even if battery voltage drops to around 9 volts.

Thus the voltage divider to limit the base current to transistor 35 comprises the two resistors 36 and 37 having their junction coupled to the base of the transistor with the distal end of resistor 36 coupled to ground and the distal end of resistor 37 at approximately 12 volts. Similarly, load resistor 40 is coupled between the collector of transistor 35 and the distal end of resistor 37. Finally, resistor 49 is coupled between potentiometer 26 and the distal end of resistor 40 to prevent saturation of the transistors at maximum current gain of the amplifier circuit.

In operation the input signal from the antenna 12 at input terminal 11 is passed through the relay 16 and outwardly along lead 17 to the circuit. Approximately one tenth of the signal is coupled through capacitor 21 and lead 22 back through relay 16 and then along lead 23 to the output terminal 13 and to the utilization device. The remaining 90 percent of the current which does not pass through capacitor 21 is passed initially through capacitor 20. When potentiometer 26 has its wiper grounded, no current flows and the transistors are cut off. When potentiometer 26 has its wiper at the maximum gain, then the maximum current flows through the base of transistor 25 causing a corresponding maximum current to the emitter of transistor 35 and hence a maximum signal develops across load resistor 40. Thus the output signal through capacitor 41 and onto lead 22 is ten times the input signal or approximately a twenty decibel gain.

Should the wiper of potentiometer 26 be positioned intermediate the two extreme points, then the gain of the amplifier circuit is somewhere between 0 and 20 decibels. This gain may be adjusted as necessary in a conventional manner such as by the provision of a knob or dial much the same as the gain or volume control on any communication device.

The foregoing explains the use of the present invention to amplify or boost the input signal to a communication system. Since there are no tuned inductive circuits, this amplifier system works equally well in the standard AM and FM bands and in general throughout the range of 0.5-175 megahertz.

Should the present invention be utilized in connection with a citizens band transceiver or any other communication device which both receives and transmits, it is necessary to bypass the amplification circuit when the communication system is in the transmit mode. Typically a microphone button or the like must be actuated by the operator of the communication device to have the communication device in a transmit mode. When this occurs, a small radio frequency signal is generated from the utilization device 14 and appears at the terminal 13.

A sensing circuit is provided to deactivate the relay 16 and thus totally bypass the amplifier portion of the circuit when the utilization device 14 is in a transmit mode. To accomplish this, a trimmer capacitor 55 is coupled to the terminal 13. This trimmer capacitor couples the radio frequency signal from the utilization device 14 into a sensing circuit while providing DC isolation. The other side of capacitor 55 is coupled to a resistor 56 which provides a current limiting function for the sensing circuit. The distal end of resistor 56 is coupled to the junction of two diodes 57 and 58, specifically, to the cathode of diode 57 and to the anode of diode 58. Diode 57 has its anode grounded and the cathode of diode 58 is coupled to the base of a transistor 60 which may be a Darlington power transistor having a grounded emitter. Capacitor 61 is coupled between the cathode of diode 58 and ground to assist in rectifying and sensing the radio frequency signal, along with the diode 57 and 58, to produce the direct current to turn on transistor 60. A potentiometer is provided in parallel with capacitor 61 to provide a delay as will be explained.

When the DC signal is of sufficient level to turn on the Darlington transistor 60, the current through the collector energizes a coil 65 which has a diode 66 coupled thereacross. This diode serves as protection for transistor 60. Energization of the coil 65 serves to energize the relay 16 to move both relay wipers to the opposite poles as shown in the dotted lines. When this occurs, a direct connection appears from lead 23 to through the relay 16 to terminal 11 and no signal appears on either lead 17 or 22. Hence the amplification portion of the circuit is completely bypassed. Resistor 62 and capacitor 61 provide a delay circuit to prevent the relay 16 from dropping to its normal position instantaneously and this is preferred so that the relay is not constantly switching on and off when the operator of the communications device momentarily releases the transmit button even though he still intends to be in a transmit mode. This feature is also important in single sideband transmitters where power and hence d.c. voltage are developed only while the operator is speaking and not during pauses between words.

The current limiting function of capacitor 55 and resistor 56 are such that small voltages, e.g., millivolts, do not turn on the transistor 60 but larger voltages, e.g., several volts, will turn on the transistor. Thus transmitted signals from the utilization unit, which range from 2-7 volts and are generally 2-4 watts, will turn on the transistor but signals received by antenna 12, even when amplified, are insufficient to turn on the transistor 60.

The foregoing is a complete description of the preferred embodiment of the present invention. Various changes may be made without departing from the spirit and scope of the present invention. Thus the invention should be limited only by the scope of the following claims.

In order to provide a complete disclosure of the present invention, the values of the resistor, capacitors, etc., are included as follows:

Resistors (all in ohms): R 26-1K; R 27-5K; R 28-2.7K; R 29-500; R 36-1.5K; R 37-10K; R 40-6.8K;

R 46-100; R 49-390; R 56-6.8K; and R 62-100K. Capacitances (all in micro farads except as noted): C 20-0.1; C 21-0.01; C 30-0.01; C 38-0.01; C 41-0.1; C 48-100; C55-50pf and C61-1. Diodes 57 and 58 are IN 914's while diode 66 is a IN 4002. Transistors 25 and 35 may be a pair of 2N5179's while transistor 60 is a power transistor such as an SFE 9300.

I claim:

1. An amplifier circuit adapted to be interposed between an antenna and a communications device such as a radio, scanner, transceiver or the like to amplify incoming signals comprising:
   an input terminal to receive incoming signals from said antenna;
   an output terminal to couple amplified signals to said communications device;
   a current divider for dividing incoming signals into first and second portions, said first portion being coupled directly from said input terminal through said current divider to said output terminal;
   a current amplifier including a pair of cascaded transistors to receive incoming signals from said second portion of said current divider and for amplifying said signals and coupling said signals to the output terminal of said amplifier circuit; and
   a filter network, coupled to said current amplifier, for bypassing to ground electrical noise, such as engine ignition noise and alternator noise, when the amplifier circuit is utilized in a mobile installation.

2. The invention as defined in claim 1 and further including a gain control to regulate the degree of amplification of said amplifier circuit.

3. The invention as defined in claim 1 and further including resistance means to prevent saturation of said cascaded transistors.

4. The invention as defined in claim 1 wherein said second cascaded transistor is connected in the grounded base configuration.

5. The invention as defined in claim 1 and further including a sensing network coupled between said input and output terminals to bypass the current divider and the current amplifier when the communications device is transmitting signals.

6. The invention as defined in claim 5 wherein said sensing network includes a relay coupled between the input terminal and said current divider, said relay normally being in a first position to pass all signals to said current divider; and
   a sensing circuit responsive to radio frequency signals from said communications device to energize said relay into a second position to bypass said current divider circuit and said amplifier circuit so that transmitted signals are passed from said communications device to said antenna.

7. An amplifier circuit adapted to be interposed between an antenna and a communications device such as a radio, scanner, transceiver or the like to amplify incoming signals received by said antenna and to pass without amplification outgoing signals from said utilization device comprising;
   an input terminal to receive incoming signals from said antenna;
   an output terminal to couple amplified signals to said communications device;
   a current divider for dividing incoming signals into first and second portions, said first portion being coupled directly from said input terminal through said current divider to said output terminal;
   a current amplifier to receive incoming signals from said second portion of said current divider and for amplifying said signals and coupling said signals to the output terminal of said amplifier circuit; and
   a bypass network including a relay being normally biased in a first position to pass incoming signals from said input terminal to said current divider and said amplifier and a sensing circuit responsive to the output from said communications device to energize the relay into a second position to pass signals from said communications device to said antenna while bypassing said current divider network and said amplifier circuit.

8. The invention as defined in claim 7 and further including a filter network coupled to said current amplifier, for bypassing to ground electrical noise, such as engine ignition noise and alternator noise, when the amplifier circuit is utilized in a vehicle.

* * * * *